Figure 1:
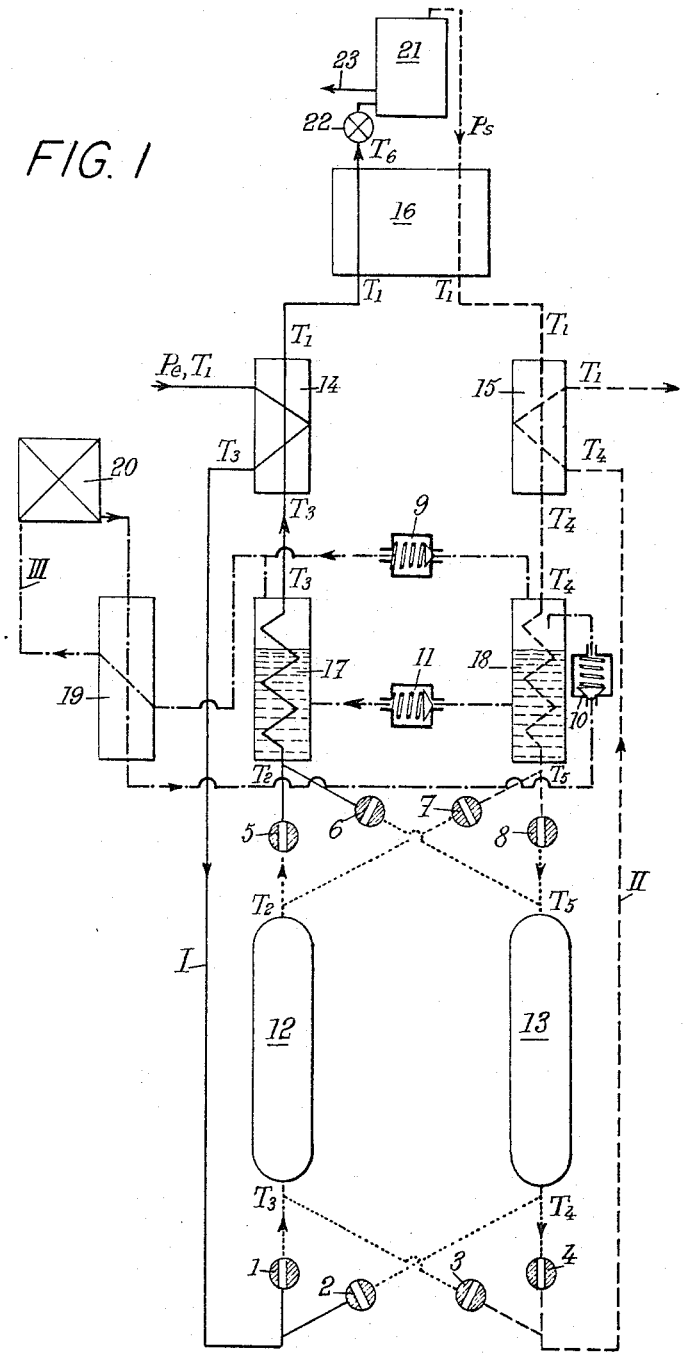

United States Patent Office 3,267,645
Patented August 23, 1966

3,267,645
DEVICES FOR PURIFYING A GAS OR A GASEOUS MIXTURE BY REVERSIBLE ADSORPTION
Guy Simonet, Paris, France, assignor of one-half to Commissariat à l'Energie Atomique, Paris, France, an organization of France, and one-half to l'Air Liquide (Societe Anonyme pour l'Etude et l'Exploitation des Procedes Georges Claude), Paris, France, a society of France
Filed June 21, 1961, Ser. No. 118,632
Claims priority, application France, June 23, 1960, 830,845
1 Claim. (Cl. 55—179)

The present invention relates to devices for purifying a gas or a gaseous mixture intended to be treated at low temperature, for instance in an apparatus for the separation of gases by liquefaction and rectification.

The separation of a gaseous mixture into its components, especially when these components liquefy at very low temperature, calls for an enormous consumption of power.

In addition to separation of the reactive components by the use of a chemical method, a rough separation may be effected by a compression followed by an expansion which permits of liquefying the greatest portion of the gas the liquefaction point of which is the highest.

In order to obtain a more complete separation and therefore to obtain at least one of the gases in the pure state, it is customary to retain the less abundant gas, generally called impurity, either in reversible exchangers or in regenerators, or again in adsorbers.

When use is made of adsorbers, adsorption of the impurity is generally performed at a temperature close to the temperature of liquefaction of this impurity. These adsorbers gradually become saturated and before reaching the limit of saturation or "breaking load," they must be replaced by clean adsorbers. It is then necessary to provide for the regeneration of the saturated adsorbers.

Several methods are used for this regeneration.

These methods are:

Discontinuous hot regeneration: The saturated adsorbers are separated from the purification circuit and are heated while being swept by a hot gas. Use in frequently made of a sweeping gas at a temperature equal to or higher than the atmospheric temperature, at variable pressures, preferably in a vacuum;

Continuous hot regeneration: This method requires at least two adsorbers, one of which is being used for adsorption while the other one is being regenerated. Regeneration also takes place at a temperature at least equal to atmospheric temperature, either at the same pressures as the adsorption, or on the contrary in a vacuum.

Finally regeneration in a so-called reversible device, adsorption and desorption taking place substantially at the same temperature. Several arrangements have been proposed, in particular a combination of regenerators and adsorbers so as to be as close as possible to reversibility.

Hot regeneration, either continuous or discontinuous, has the serious drawback of requiring an enormous consumption of power to bring back into service an adsorber which has been regenerated. It also creates an important loss of cold during regeneration. Such system can be accepted only in the case of small or medium plants for the treatment of a gas containing a very low percentage of impurity. It is the case in particular of plants for the treatment of electrolytic hydrogen containing traces of nitrogen. For higher percentages of impurity and for big industrial plants, this method is not acceptable. Therefore, only the reversible adsorption methods can be taken into consideration. The known solutions for working close to perfect reversibility permit of regenerating the adsorbant at pressures and temperatures very close to those used during the adsorption step. The thermal balance is therefore quite favorable.

However, these known solutions also involve drawbacks either due to the fact that regeneration requires, in practice, amounts of sweeping gas much greater than the amounts of gas to be purified so that reversibility is not obtained, or to the fact that it is not possible to obtain a complete regeneration of the adsorbent, which leads either to using adsorbers of very great dimensions and therefore to increasing the amount of cold necessary for their operation or to multiplying the reversals, that is to say the replacements of saturated adsorbers by regenerated adsorbers, which also multiplies the transitory periods for obtaining a stable working, at the expense of a good thermal balance.

Another drawback of some of the solutions which have been proposed up to now is that frigorific reversibility is obtained only at the cost of a temperature gradient in the adsorbers, one end being at the low temperature of adsorption, the other end being at the high temperature of regeneration and this gradient being continuous from one end to the other. This difference of temperature may have a very detrimental effect when it is desired to obtain very pure products by adsorption, since a high purity requires in practice a long time of contact at constant temperature of the gas to be purified with the adsorbent.

The object of the present invention is to obviate these drawbacks in reversible adsorption devices. For this purpose, in a conventional reversible adsorption device comprising at least one adsorber working to purify the gaseous mixture and at least one adsorber that is being regenerated at the same time, there is provided an auxiliary circuit intended to convey the whole of the heat produced during the adsorption, at high pressure, of the impurity to the sweeping gas, under low pressure, serving to regenerate the adsorbent while ensuring an automatic regulation of the respective temperatures of the purified gas and of the sweeping gas.

This auxiliary circuit essentially comprises:

A first exchanger, the first compartment of which contains a liquid in the presence of its vapor and the second compartment of which serves to the flow of the purified gas coming from the adsorber that works as a purifier, the pressure in the first compartment of this first exchanger being maintained at the value corresponding to the desired temperature, A second exchanger the first compartment of which contains the same liquid in the presence of its vapor and through the second compartment of which flows the sweeping gas coming from the treatment apparatus before said gas enters the adsorber that is being regenerated, the pressure in the first compartment of this exchanger being maintained at the value corresponding substantially to the desired temperature, Means for permitting a flow of the liquid and of its vapor from the second exchanger to the first one, And a compressor the output of which is connected to the top of the first compartment of the second exchanger through the intermediate of an expansion valve and the intake of which is connected to the top of the first compartment of the first exchanger.

This auxiliary circuit permits of obtaining thermal reversibility of an adsorption device where the adsorption, under pressure, for instance at a pressure ranging from 5 to 100 kgs./cm.$^2$ and the desorption, at a pressure close to atmospheric pressure, take place at respective temperatures relatively close to each other, which is the essential condition of reversibility, in such manner that these two temperatures result from the equilibrium of the same liquid under two different pressures, by direct utilization of the cold produced by desorption and by the preheating of the saturated elements in order to compensate for the heat produced by adsorption and by the cooling of the regenerated elements, this without exerting any influence upon the inlet and outlet general temperatures of the gas to be treated. This system permits an automatic regulation of these temperatures, which are therefore perfectly stable.

This device is particularly interesting when it is possible to obtain adsorption and desorption at respective temperatures very close to each other, which permits a great thermal stability of operation, even during the reversal periods, and therefore avoids a loss of power and the expenses required for the thermal isolation necessary in a conventional plant between the adsorbers that are working as purifiers and those where desorption takes place.

Another important advantage of this device is that it requires for regeneration purposes only an amount of sweeping gas much smaller than the amount of purified gas. In a plant which is not intended for the production of a pure gas, but uses this pure gas for another production (this is the case for instance of the use of pure hydrogen for the production of deuterium), this device therefore permits of obtaining a substantial amount of this pure gas as by-product, which is very advantageous.

Finally, this device permits of obtaining another very interesting industrial result. As a matter of fact, desorption permits a great concentration of the impurity in the sweeping gas. If this impurity is interesting from an economic point of view, this concentration is taken advantage of and the sweeping gas is fractionated when leaving the adsorber that is being regenerated, so as to take advantage of the high percentage of said impurity in the head portion. This method permits for instance a cheap concentration of the rare gases of air and permits of obtaining them subsequently in the pure state by distillation.

Another interesting application of this desorption method is the possibility of effecting a fractionated desorption which permits of separating concentrates of components that have been previously adsorbed. By adjustment of the temperature and of the pressure of the sweeping gas it is possible to obtain, when desorbing, several portions where the components previously adsorbed are selectively concentrated. This fractionated desorption, analogous to a chromatography, may possibly be followed by a further reversible adsorption which improves fractioning. As a matter of fact, whatever be the finishing method that is considered, there is obtained after this desorption a plurality of fractions consisting of a sweeping gas very rich in at least one of the components that have been previously adsorbed. For instance, when purifying hydrogen which contains 1.5% of nitrogen, there is obtained during the desorption a portion of sweeping gas where the concentration in nitrogen is as high as 10%. This method therefore permits not only a cheap concentration of the rare gases of air but also a first separation thereof.

Figure 2:
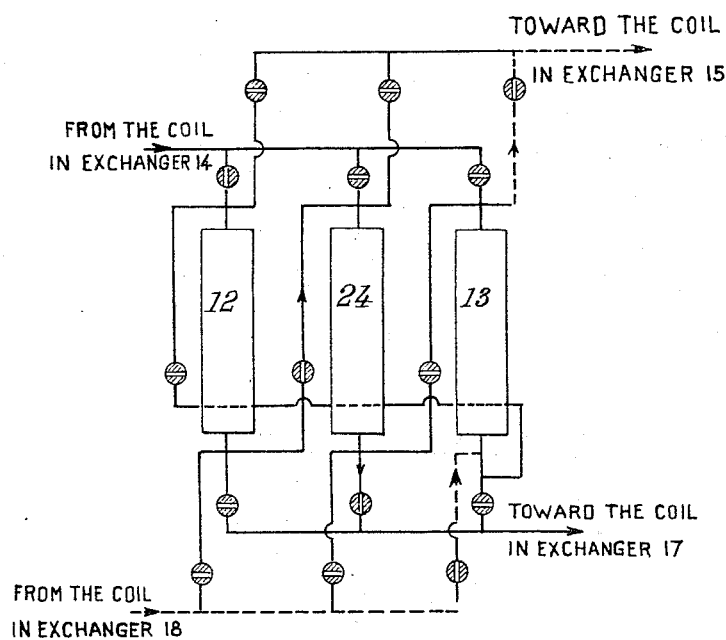
Figure 3:
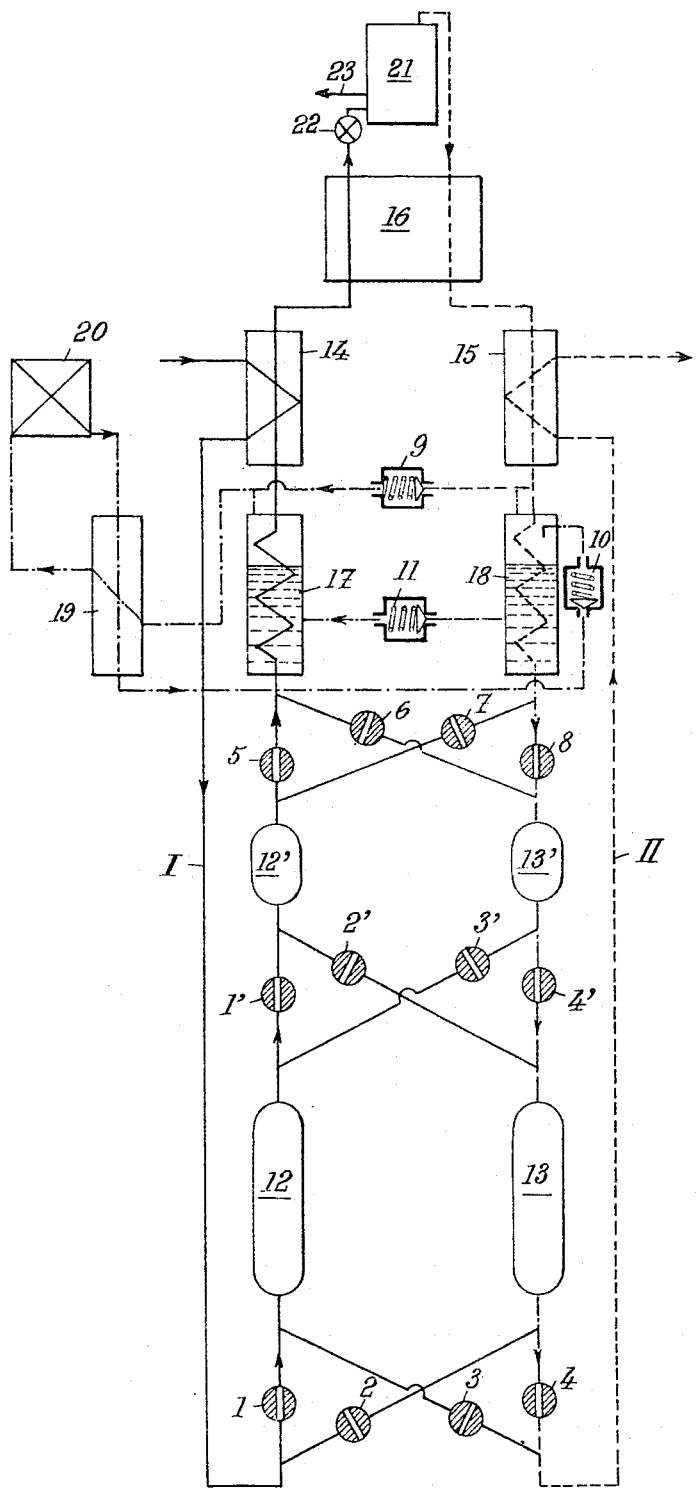

A preferred embodiment of the present invention will be hereinafter described with reference to the accompanying drawings, given merely by way of example and in which:

FIG. 1 diagrammatically shows a purification device according to a first embodiment of the invention;

FIG. 2 diagrammatically shows a modification of the device of FIG. 1;

FIG. 3 is a view similar to FIG. 1, showing a second embodiment of the invention.

These figures show:

The circuit I of the gas to be purified, shown in solid lines,

The circuit II of the sweeping gas, shown in dotted lines,

The auxiliary circuit III shown in dot-and-dash lines, the portion common to circuit I and II being shown in light dotted lines, Valves 1, 2, 3, 4, 5, 6, 7, and 8 which permit of reversing each of the circuits I and II, The expansion or pressure variation valves 9, 10 and 11 of auxiliary circuit III, Adsorbers 12 and 13, Heat exchangers 14, 15 and 16, The auxiliary circuit, which comprises heat exchangers 17 and 18, each of which contains a liquid in the presence of its vapor, exchanger 19 and compressor 20.

The gas to be purified (circuit I in solid lines) enters the coil of heat exchanger 14 under pressure $Pe$ and at temperature $T_1$. This gas flows out of said exchanger 14 at a temperature $T_3$ and flows to adsorber 12 through valve 1. For this purpose, valves 1, 4, 5 and 8 are open and valves 2, 3, 6 and 7 are closed. The purified gas leaving adsorber 12, where it has left its impurity, thus becoming heated, passes through valve 5 and through the coil of exchanger 17, which coil is located in a boiling liquid (i.e., a liquid in the presence of its vapor) so that the temperature of the gas at the upper end of said coil is $T_3$. This gas then passes through exchanger 14 from which it flows out at temperature $T_1$; then it passes to exchanger 16 in counter-current to the sweeping gas. The pure gas, or to be more accurate the pure gaseous mixture to be separated into its components, is fed to distillation column 21 through an expansion valve 22. When the gas to be purified is for instance a mixture of hydrogen and deuterium containing nitrogen as main impurity, this nitrogen is retained in adsorber 12 and the mixture is separated, in 21, into deuterium, which is withdrawn through conduit 23, and hydrogen, a portion of this hydrogen being used as sweeping gas.

The sweeping gas at pressure $Ps$ flowing from apparatus 21 enters heat exchanger 16, from which it flows out at temperature $T_1$. Then this gas passes through heat exchanger 15 and thence into the coil of heat exchanger 18, said coil being immersed in the liquid in the presence of its vapor, filling said exchanger 18, whereby the temperature of the gas flowing through said coil is $T_5$. It then passes through valve 8 and enters adsorber 13 where it exerts a regenerating action by removing the impurity accumulated in said adsorber 13. The sweeping gas is cooled as a result of its passage through adsorber 13. Finally this gas passes through valve 4 to exchanger 15 where its temperature is raised to the valve $T_1$. The sweeping gas then leaves the plant and is generally sent to mix with the main stream of gas leaving from apparatus 21, from which it was collected.

The compressor 20 of the auxiliary circuit permits, during the starting period, of producing the liquid of exchangers 17 and 18 and compensates, if necessary, for the slight heat loss by compression of the gas produced in said exchanger. The pressures $P_3$ and $P_5$ in the compartments of exchangers 17 and 18, respectively, belonging to said auxiliary circuit are adjusted in such manner as to obtain the simultaneous presence of the liquid and vapor phases in these compartments of these exchangers, respectively at temperatures $T_3$ and $T_5$. The expansion valves 9, 10 and 11 permit of maintaining exchangers 17 and 18 at the respective different pressures $P_3$ and $P_5$. Exchanger 19 the two compartments of which are connected respectively with the intake and the output of compressor 20 lowers the temperature of the fluid issuing from compressor 20.

The auxiliary circuit therefore permits of directly determining the temperature of the sweeping gas before it enters adsorber 13 and of indirectly determining, through exchanger 14, the temperature of the gas to be purified before it enters adsorber 12. Adsorption temperature $T_3$ is fixed by the pressure $P_3$ existing above the liquid boiling in exchanger 17, and regeneration temperature $T_5$ is fixed by the pressure $P_5$ existing above the same liquid in exchanger 18.

When adsorber 12 is saturated at the end of an adsorption period, that is to say when it reaches the "breaking load" and adsorber 13 has been regenerated, valves 1, 4, 5 and 8 are closed while valves 2, 3, 6 and 7 are opened. Adsorber 13 then receives the gas to be purified at pressure $Pe$ and at temperature $T_3$. The cold necessary to the operation of this adsorber 13 is supplied by the gas itself which is heated up to temperature $T_2$. These operations will therefore produce a boiling of the liquid in exchanger 17 corresponding to the difference of temperature $T_2$–$T_3$. Likewise the sweeping gas at pressure $Ps$ and at temperature $T_5$ gradually heats absorber 12 which is going to be regenerated. The heat necessary for the heating of this adsorber 12 and also that necessary for desorption are supplied by the gas itself which will cool down to temperature $T_4$. Thus the preceding operations concerning desorption correspond to a condensation of the vapor in exchanger 18 corresponding to the difference of temperature $T_5$–$T_4$.

With the exception of the heat losses in the whole of the device and of the temperature differences in the exchangers, which two slight defects may be constructionally reduced to small relative values, the amount of vapor that condensates in exchanger 18 must be equivalent to the amount of liquid vaporized in exchanger 17. The desired thermal compensation is directly ensured by the flow of the liquid formed in exchanger 18 toward exchanger 17, the difference of the vaporization heats under pressures $P_5$ and $P_3$ being compensated by the vaporization by expansion through valve 11. At the same time vapor flows from exchanger 18 toward exchanger 17 through valve 9.

Thus the auxiliary circuit, both under stable working conditions and during the reversal periods, acts as an automatic regulator of the temperature of the gas to be purified and of the sweeping gas.

This reversible adsorption device may be made according to various modifications. In particular, as shown by FIG. 2, it may be advantageous to make use of three adsorbers 12, 24 and 13 instead of two. In this case, the valves are arranged so that two adsorbers 12 and 24 are mounted in series in the purification circuit while the third adsorber 13 is being regenerated. This modification permits of saturating the adsorbers completely without being limited by the "breaking load" and produces an increased safety of operation. Once an adsorber has been saturated, a circular permutation of the adsorbers is effected by operating the valves. Thus the adsorber 12 that first received the gas to be purified, and which is therefore wholly saturated, is placed into regeneration conditions whereas the gas to be purified is sent first to the adsorber 24 already in use for purification then to the adsorber 13 which has just been regenerated.

Another modification of the device illustrated by FIG. 3 consists in mounting in series with the adsorber device constituted by adsorbers 12 and 13 another adsorber device comprising two adsorbers 12' and 13' The same auxiliary circuit 9–10–11–17–18–19–20 is used for both of the adsorption devices. But, owing to valves 1', 2', 3' and 4', adsorber 12' may be connected to the outlet of adsorber 13 and adsorber 13' to the outlet of adsorber 12 and the period of reversal of the second device 12'–13' is about 100 times longer than that of the first device 12–13. The second adsorber device 12'–13' merely stops the sudden arrivals of impurities which may be produced when bringing into the adsorption circuit one of the adsorbers of the first device which had just been regenerated. These sudden arrivals result from the reheating of the adsorber consecutive to the compression produced in the adsorber when the presence therein is increased after regeneration. The purified gas issued from the adsorber of the second device flows through the boiling liquid exchanger 17. Regeneration of the adsorber of the second device is effected by a portion of the sweeping gas issuing from exchanger 18.

The reversible adsorption device according to this invention may serve to purify many gases. The auxiliary circuit must comprise in the case of every gas a liquid determined by the impurity to be eliminated. Some examples of gases will now be cited with reference to the liquid to be used in the auxiliary circuit for each of them.

| Gas to be purified: | Liquid of the auxiliary circuit |
|---|---|
| Hydrogen | Oxygen, nitrogen, air |
| Helium | Nitrogen, oxygen, air |
| Hydrocarbons | Ammonia, methane, butane, propane, etc. |

Thus when the gas to be purified is a mixture of hydrogen and deuterium containing as impurity an amount of nitrogen of about 20%, the reversible adsorption device according to the invention has the following characteristics:

The gas to be purified enters the device at a temperature $T_1$ equal to 64° K. and at a pressure $Pe$ ranging from 15 to 30 atmospheres.

The sweeping gas, which consists of pure hydrogen, enters the device at temperature $T_1$ and at a pressure $Ps$ ranging from 1 to 3 atmospheres.

The liquid of exchangers 17 and 18 of the auxiliary circuit is nitrogen which, in exchanger 17, is at a pressure $P_3$ ranging from 0.2 to 1 atmosphere and in exchanger 18 is at a pressure $P_5$ ranging from 5 to 15 atmospheres. The temperature of these two exchangers therefore ranges, for exchanger 17, (temperature $T_3$) from 65° to 78° K. and for exchanger 18 (temperature $T_5$) from 93° to 108° K. The temperature $T_2$ of the purified gas flowing out from the adsorber that is being used for purification averages 85° K. whereas the temperature $T_4$ of the sweeping gas leaving the adsorber that is being regenerated is such that $T_5$–$T_4$ decreases from 20° K. to 3–4° K. during the operation. The temperature $T_6$ of the purified gas leaving exchanger 16 ranges from 20 to 25° K.

What I claim is:

In a device for purifying a gaseous substance containing at least one impurity to permit treatment of the purified substance at low temperature in a treatment apparatus, the combination of two adsorbers, a first one and a second one, a feed circuit connected to said first adsorber and said treatment apparatus for passing said gaseous substance under high pressure through said first adsorber, to leave said impurity therein, and thence to said treatment apparatus, an outflow circuit connected to said treatment apparatus and second adsorber for passing a portion of the treated gas from said treatment apparatus, called sweeping gas, through said second adsorber, to remove therefrom the impurity precedingly accumulated therein, valve means for periodically reversing the connections between on the one hand said feed circuit and said outflow circuit and on the other hand said two adsorbers, whereby during one period one of said adsorbers acts as purifying adsorber while the sweeping gas removes the impurity accumulated in the other adsorber, and during the next period the functions of the two adsorbers are exchanged, and an auxiliary fluid circuit out of communication with said feed circuit and with said outflow circuit, said auxiliary circuit being arranged for the circulation therethrough, always in the same direction, of an auxiliary fluid, heat interchange means between a portion of said auxiliary circuit and said outflow circuit, upstream of the second adsorber thereof, and heat interchange means between another portion of said auxiliary circuit and said feed circuit downstream of the first adsorber thereof, for conveying to said outflow circuit substantially the whole of the heat given off in said feed circuit by the adsorption of the impurity in the purifying adsorber, pressure variation valve means in said auxilary circuit for determining the respective pressures in said portions of said auxiliary circuit where said respective heat interchange means are provided, said auxilary fluid circuit comprising a first heat exchanger forming a first chamber through which extends said feed circuit downstream of said first adsorber, and a liquid in the presence of its vapor in said first chamber, a second heat exchanger forming a second chamber through which extends said outflow circuit upstream of said second adsorber, the same liquid in the presence of its vapor being in said second chamber, a compressor having its output connected to the top part of said second chamber, an expansion valve interposed between said compressor output and said second chamber, said compressor having its intake connected with the top part of said second chamber, conduit means between the top parts of said chambers, conduit means between the bottom parts of said chambers, and expansion valves in each of said two last mentioned conduit means to permit the flow of vapor and liquid, respectively, from said second chamber to said first chamber.

References Cited by the Examiner
UNITED STATES PATENTS

| | | | |
|---|---|---|---|
| 2,328,521 | 8/1943 | Wittmann | 55—163 |
| 2,535,902 | 12/1950 | Dailey | 55—33 |
| 2,561,441 | 7/1951 | Low | 55—163 |
| 2,944,627 | 7/1960 | Skarstrom | 55—62 X |
| 3,007,543 | 11/1961 | Maher | 55—180 X |
| 3,024,867 | 3/1962 | Milton | 55—62 X |

REUBEN FRIEDMAN, *Primary Examiner.*

EUGENE BLANCHARD, *Examiner.*